United States Patent [19]

Horii et al.

[11] 4,320,316
[45] Mar. 16, 1982

[54] OPERATION TIME CONTROL APPARATUS

[75] Inventors: Horoshi Horii, Kashihara; Masao Itou, Nara; Hidenosuke Matsumoto; Toshio Marumo, both of Kusatsu, all of Japan

[73] Assignee: Matsushita Electric Industrial Co., Ltd., Kadoma, Japan

[21] Appl. No.: 140,779

[22] Filed: Apr. 16, 1980

[30] Foreign Application Priority Data

Apr. 26, 1979 [JP] Japan .................... 54-052099

[51] Int. Cl.³ .................... H03K 5/13; H03K 5/159
[52] U.S. Cl. ............................ 307/595; 62/158
[58] Field of Search .............. 307/595, 590, 592; 62/158

[56] References Cited

U.S. PATENT DOCUMENTS 3,421,027  1/1969  Maynard et al. .......... 307/595
3,777,240 12/1973  Neill ........................ 62/158
4,047,058  9/1977  Green ....................... 307/595

Primary Examiner—Alfred E. Smith
Assistant Examiner—T. N. Grigsby
Attorney, Agent, or Firm—Cushman, Darby & Cushman

[57] ABSTRACT

The timer circuit of the present invention comprises a comparator, which, in the example of the air conditioner, compares the room temperature measured by a thermistor with a predetermined value and charges the timer capacitor of the timer circuit when its output is in ON state, and makes the capacitor discharge when its output becomes in OFF state; thereby the timer circuit can produce the first set time, for example, by the abovementioned discharging time, in this first set time a compressor circuit being made OFF for prevention of overloading due to a too-early restarting, and furthermore, with utilizing the same timer circuit with a modified predetermined value of the comparator thereby producing subsequent cycles of charging and discharging and accumulating a predetermined number of repetition of the cycles, a desired longer time for the second time can be produced.

4 Claims, 6 Drawing Figures

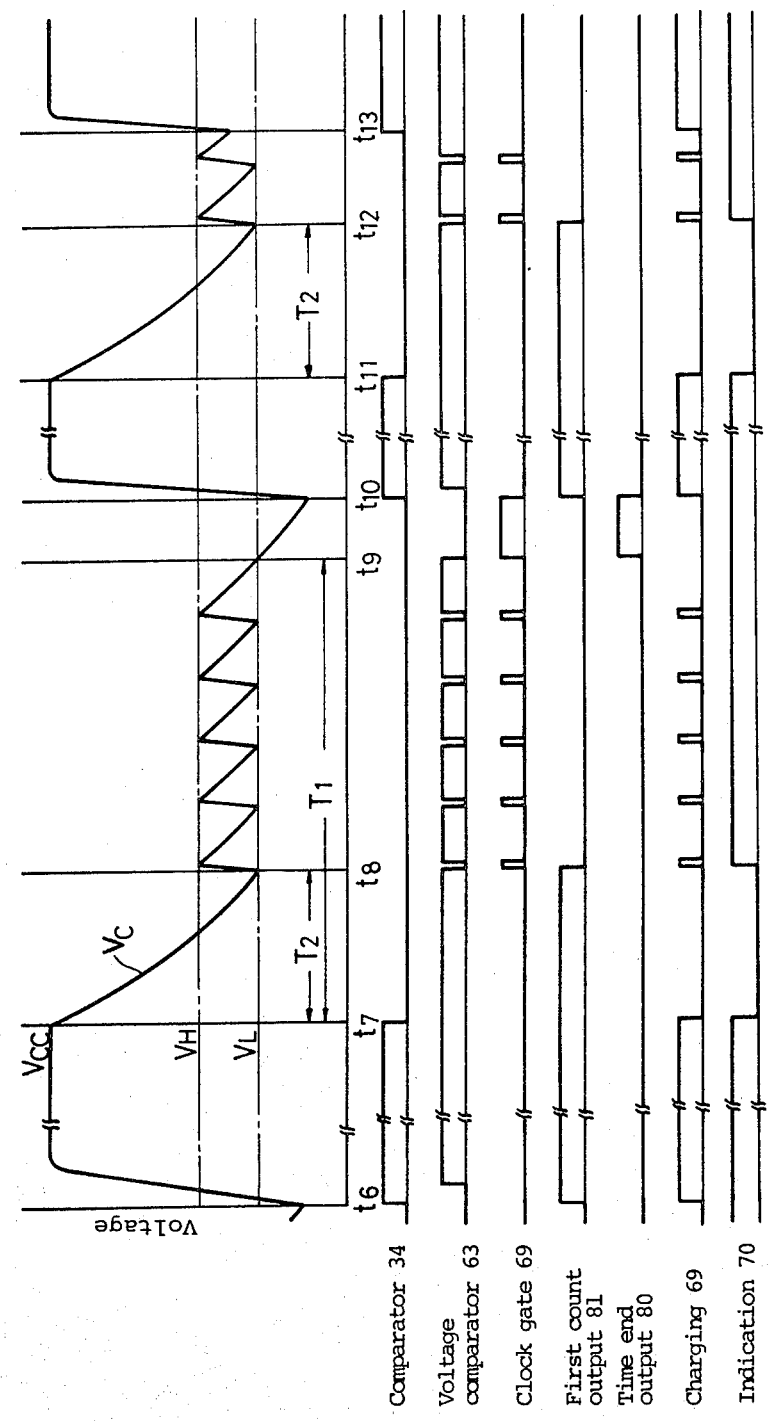

OPERATION TIME CONTROL APPARATUS

BACKGROUND OF THE INVENTION

1. Field of the Invention:

The present invention relates to an operation time control apparatus for electric appliances, for example, an air condition or an refrigerator-freezer.

2. Prior Art

In general, a modern type air conditioner employs at least two timers, a first timer for prevention of reenergization of a compressor for a predetermined short time, such as 3 minutes from a stopping, and a second time, such as 8 minutes, for restarting of the compressor to avoid discomfort from gradual increase of humidity when temperature rise is very slow. To elucidate more in detail about such operation:

Immediately after a stopping the compressor has a very high back-pressure. Therefore, if a compressor motor is energized immediately after a stopping, such high back-pressure hinders the rotation of the motor thereby causing a harmful overloading sometimes leading to a burning of the compressor motor. In order to avoid such inconvenience, there has been a need to provide a mean to prevent a restoration of operation of the compressor immediately after a stopping. This is the reason to necessitate the first timer.

The reason to necessitate the second timer is as follows:

By operation of the compressor motor, the temperature and the moisture of the room air decreases. Then, at a detection of lowering the room temperature beneath a predetermined temperature, the compressor is stopped by the function of the thermostat. Then, both the temperature and the moisture increase. Generally speaking, moisture reaches an unpleasant range faster than temperature's reaching an unpleasant range. However, the thermostat makes the compressor start by detection of only a temperature rise, and therefore, the atmosphere in the airconditioned room becomes uncomfortably moist prior to a restoration of operation of the compressor by means of the thermostat. In order to avoid such inconvenience, there has been a need to provide a measure to restore the compressor motor prior to a detection of the predetermined temperature by the thermostat when a pausing of the compressor lasts longer than a predetermined period. For such reason the second timer is used.

Hitherto, for the abovementioned purpose, two timer circuits, each comprising a timing capacitor and a timing resistor, have been employed. Since the capacitor and resistor of such timer circuit should be of high accuracy, the providing of the two timer circuits causes an increase of cost.

SUMMARY OF THE INVENTION

The present invention purposes to provide the abovementioned air conditioner with a reduced cost by employing only one timer circuit but enabling to count two kind of time period, for example, in an air conditioner, the abovementioned first time period of the compressor overload prevention time and the second time period of the humidity removing restarting time.

The timer circuit of the present invention comprises a comparator, which, in the example of the air conditioner, compares the room temperature measured by a thermistor with a predetermined value and charges the timer capacitor of the timer circut when its output is in ON state, and makes the capacitor discharge when its output becomes in OFF state. The timer circuit can produce the first set time, for example, by the abovementioned discharging time, in this first set time, irrespective of comparator output state, a compressor circuit being made OFF for prevention of overloading due to a too-early restarting. Furthermore, with utilizing the same timer circuit with a modified predetermined value of the comparator thereby producing subsequent cycles of charging and discharging and accumulating a predetermined number of repetition of the cycles, a desired longer time for the second time can be produced.

BRIEF DESCRIPTION OF THE DRAWING

FIG. 6 is a time chart to illustrate operation of the circuit of FIG. 5.

DETAILED DESCRIPTION OF THE PREFERRED EMBODIMENT

The operation time control apparatus in accordance with the present invention comprises:

a comparator which issues ON-output signal and OFF-output signal responding to input signal thereto, a timer circuit including a capacitor which is charged with said ON-output signal and is made to discharge upon issuing of said OFF-output, a dual level comparator, output signal of which turns off when an output voltage of said timer circuit at the time after a turning off of said comparator decreases to a lower reference voltage $V_L$ and turns on when the output voltage of said timer circuit restores to a higher reference voltage $V_H$, a counter which counts OFF-signals issued from said dual level comparator when said comparator turns off, and issues a first output signal based on a first output of said dual level comparator and a time-end output signal when a predetermined number of said OFF-signals are counted, a charge control circuit which, during a time period from the issuing of said first output signal to the issuing of said time-end output signal, makes the charging of said capacitor with an OFF-output from said dual level comparator, and a prevention circuit which prevent transfer of output of said comparator to an output circuit during a time period from a turning off of the output of said comparator to said issuance of said first output signal.

The invention is elucidated in detail hereinafter, referring to the accompanying drawings.

Figure 1:
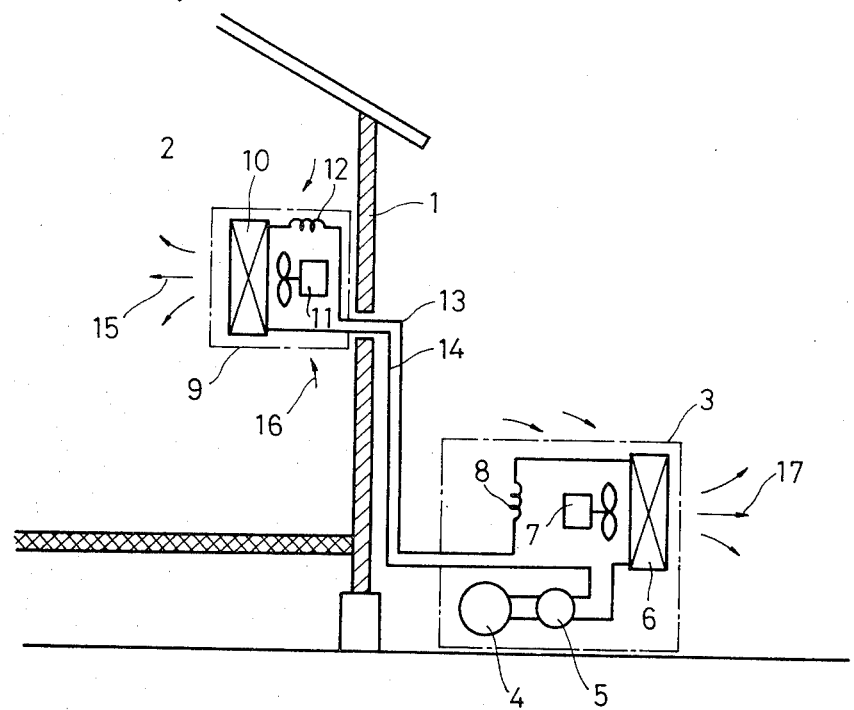
FIG. 1 is a schematical sectional elevation view of a building comprising an air conditioner, wherein an operation time control apparatus embodying the present invention is employed.

In FIG. 1, which is a schematic sectional elevation view of a building comprising an air conditioner employing an operation time control apparatus embodying the present invention, the air conditioner comprises an indoor unit 9 in a room 2 inside the building 1 and an outdoor unit 3 outside the building 1. The indooor unit comprises an indoor heat exchanger 10, a capillary tube 12 connected in series to and in the upstream relation to the indoor heat exchanger 10 and a motor 11 for driving an air circulation fan which absorbs air 16 and blow out the conditioned air 15. The outdoor unit 3 comprises a compressor 4, a four-way valve 5, an outdoor heat exchanger 6, a capillary tube 8 and a motor 7 to drive a fan to circulate the outdoor air 17 through the outdoor heat-exchanger 6. The indoor unit 9 and the outdoor unit 3 are connected each other by the refrigerant pipes 13 and 14. In a room cooling operation, by means of switching by the four-way valve 5, the outdoor heat exchanger 6 works as a condenser and the indoor heat-exchanger 10 works as an evaporator. On the contrary, in a room heating operation, the four-way valve 5 is switched to make the refrigerant flow inverse to the room cooling case, so that the abovementioned workings of the indoor and outdoor heat-exchangers becomes inverse.

Figure 2:
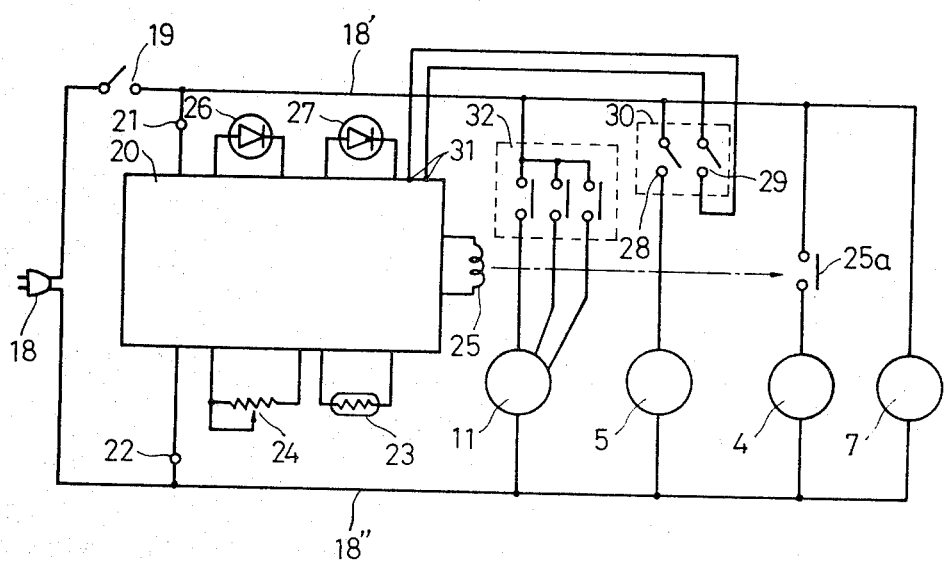
FIG. 2 is a circuit diagram of an example of the air conditioner of FIG. 1.

The electric circuit construction of the air conditioner shown in FIG. 1 is illustrated in FIG. 2, wherein a control apparatus 20, the fan motor 7, the compressor 4 through a normal open contact 25a of a relay 25 a switching means of the four-way valve 5 through a heat-cool selection switch 30, and the indoor fan motor 11 through a fan speed control switch 32 are connected across A.C. lines 18' and 18'' which are connected through a power switch 19 and a connection plug 18 to commercial A.C. lines. A thermistor 23 for measuring the temperature of the room 2, a variable resistor 24 for setting a target temperature, indication lamps 26 and 27 to indicate state of the relay 25 and lines from the heat-cool selection switch 30 are connected to the control apparatus 20.

Figure 3:
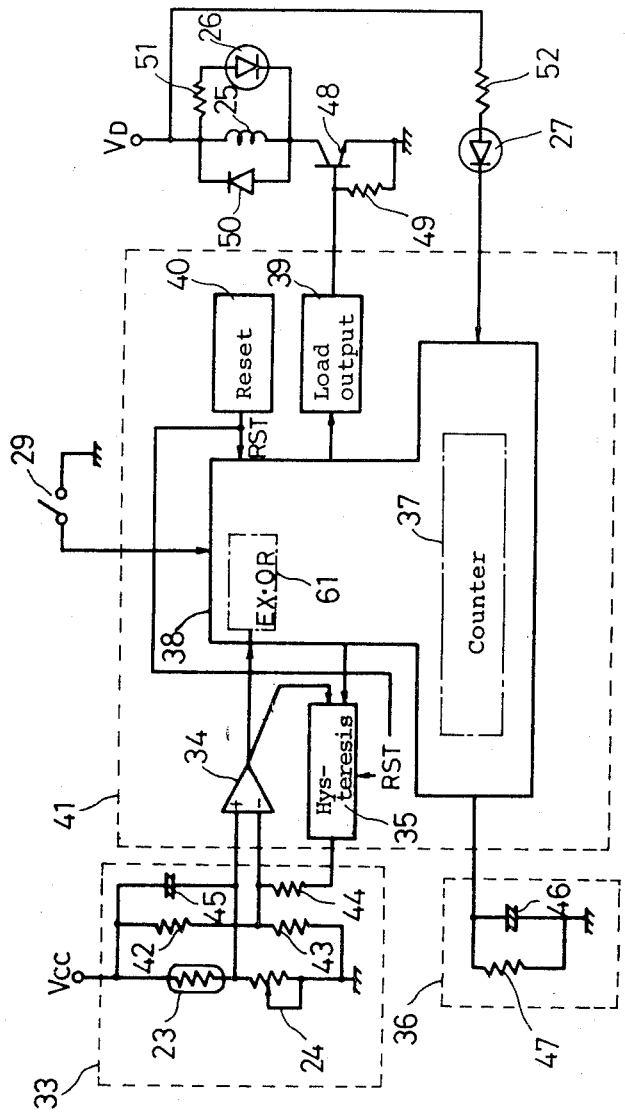
FIG. 3 is a circuit diagram of an operation time control apparatus embodying the present invention.

FIG. 3 is a circuit diagram of an operation time control apparatus embodying the present invention, the principal part thereof being included in the control apparatus 20, and operation of the operation control apparatus is elucidated below by the timing chart of FIG. 4. In the circuit of FIG. 3, the thermistor bridge 33 comprises the thermistor 23 and the variable resistor forming a series connection across a positive source terminal $V_{CC}$ and a negative terminal, and reference resistors 42 and 43 connected in series each other. The temperature measurement output signal of the thermistor bridge 33 is given across the input terminals of the comparator 34. A hysteresis circuit 35 receives output signal of the comparator 34 and a signal from a control logic circuit 38 and gives an output signal through a gap resistor 44 thereby to define a gap voltage of the thermistor bridge 33. A timer circuit 36 comprises a resistor 47 and a timer capacitor 46 is charged based on an ON output of the comparator 34 and gives its output to the control logic circuit 38. The logic circuit 38 further comprises digital timer 37 which issues output signal by counting a predetermined number of digital pules produced from output signal of the timer circuit 36. The control logic circuit 38 makes the compressor 4 driven with a predetermined order determined by the output of the digital timer 37 and the comparator 34. The load output circuit 39 is for outputting a signal which makes the output relay 25 be energized. A reset circuit 40 is provided to give reset signals to reset-signal input terminals RST of various part, thereby to reset necessary circuit upon each switching off of the power supply. An output transistor 48 is provided so as to drive the relay 25 by receiving the output signal from the load output circuit 39 at its base. A spike voltage killer diode 50 and the compressor-operation indication lamp (LED) 26 are connected parallelly to the relay 25. The indication lamp (LED) 27 is for indication of the time period $T_2$ of compressor-restart prevention. A capacitor 45 connected parallelly to the thermistor 23 is for prevention of noise.

Figure 4:
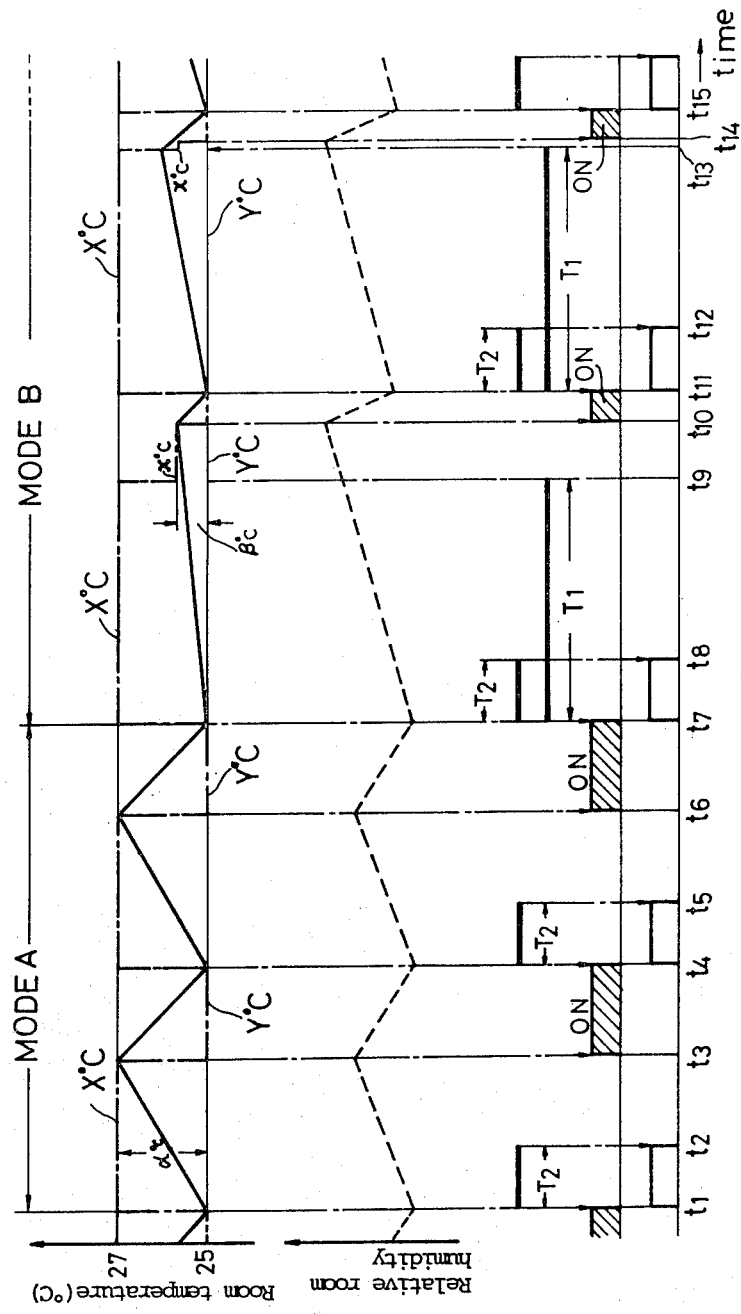
FIG. 4 is a time chart to illustrate operation of the apparatus of FIG. 3.

The operation of the circuit of FIG. 3 is elucidated referring to FIG. 4, wherein the state when the cool-heat selection switch 29 is turned OFF, thereby selecting the cooling operation. Provided that the variable resistor 24 is set to select the target temperature of 25°–27° C., when the room temperature becomes lower than a predetermined OFF-temperature of, for example, 25° C., the output of the comparator 34 turns from hitherto ON to OFF, thereby making the load output circuit 39 to make the relay 25 OFF, hence making the contact 25a OFF and deenergizing the compressor 4. On the contrary, when the temperature rises higher than a predetermined ON-temperature of, for example, 27° C., the comparator 34 turns from OFF to ON, thereby making the load output circuit 39 to make the relay 25 ON, hence making the contact 25a ON and energize the compressor 4. In FIG. 4, the part indicated as mode A shows repetition of the abovementioned starting and stopping of the compressor 4 due to change of the room temperature. When the room temperature decrease to the OFF-temperature Y°C. (namely 25° C. in this example) at the time $t_1$, due to increase of the resistance of the thermistor 23 the voltage of the input terminal + of the comparator 34 becomes lower than that of the terminal −, thereby turning the output of the comparator 34 OFF and hence deenergizing the compressor 4. At the same time, by means of the turning OFF of the output of the comparator 34, the differential amplifier 35 becomes OFF and hence disconnect the lower end of the hysteresis resistor 44 from the negative (ground) terminal of the D.C. power source. As a result of the disconnection, the reference voltage of the bridge 33, that is, the voltage at the input terminal—of the comparator 34 is shifted to become higher by the amount of $\Delta V$ than the reference voltage of the bridge 33 at the time of energization of the compressor 4. This means that the setting of the output of the bridge to switch the comparator 34 is instantaneously shifted from the temperature of Y°C. to the temperature of X°C. (for example 27° C.).

Incidentally, before the time $t_1$, the room temperature was above the OFF-temperature Y°C., and therefore, the output of the comparator 34 was ON (thereby energizing the compressor), and the capacitor 46, of the timer circuit 36 was charged up almost to the positive power source voltage by ON output of the comparator 34; and at the time $t_1$, the output signal of the comparator 34 turns OFF, and the capacitor 46 of the timer circuit 33 is discharged through the resistor 47; and when the voltage of the capacitor 46 decreases to a predetermined lower reference voltage $V_L$, the control logic circuit 38 issues an output at the time $t_2$. The time period $T_2$, which is between the time $t_1$ and $t_2$, is a time period to prevent restarting of the compressor 4, and during which the control logic 38 does not restart the compressor 4 even when an ON signal is issued from the comparator 34 or when the power switch is turned OFF and then ON again. The restart-prevention indication lamp 27 is lit only during the time period $T_2$. The abovementioned explanation has been for the mode A operation (wherein only the time period $T_2$ appears).

Next, elucidation is made for a mode B operation wherein two kinds of time period $T_1$ and $T_2$ appears. This operation mode appears when the cooling load is not so heavy.

In FIG. 4, when the room temperature decreases to the OFF-temperature Y°C. at the time $t_7$, the output of the comparator 34 turns to OFF and hence the differential circuit 35 cut out hysteresis resistor 44 from the bridge circuit, thereby instantaneously shifting the predetermined temperature to switch the comparator 34 from OFF-temperature Y°C. upwards to ON-temperature X°C. And at the same time ($t_7$), the capacitor 46 of the timer circuit 36 starts discharging. When the voltage across the capacitor 46 decreases to the reference voltage $V_L$ at the time $t_8$, the digital timer 37 issues an output signal to release the prevention of restarting of the compressor 4. The process in the time period $T_2$, from $t_7$ to $t_8$, is identical to that in the aforementioned mode A.

Then, after the time $t_8$, the timer circuit 36 is charged and discharged thereby changing its output voltage between the higher reference voltage $V_H$ and the lower reference voltage $V_L$, then the capacitor 46 of the timer circuit 36 discharges from the higher reference voltage $V_H$, and when the voltage across the capacitor 46 decreases to the lower reference voltage $V_L$, a clock signal is issued from the control logic circuit 38. By counting repeated occurrence of the clock signals up to a predetermined number, a time-end signal is issued at the time $T_9$, thereby defining a timer period $T_1$ which is between the times $t_7$ and $t_9$. Also, the time-end signal makes the differential circuit 35 to restore the connection of the gap resistor 44 to the bridge circuit 33, thereby instantaneously lowering at the time $t_9$ the predetermined temperature to switch the comparator 34 from the ON-temperature X°C. down to x°C., which is higher than the OFF-temperature Y°C. by $\beta$°C. ($\beta$ is hereafter called gap temperature). Hereinafter, the time period $T_1$ (which is from $t_7$ to $t_9$) is referred as forced restoration time. The abovementioned gap temperature $\beta$°C. is obtained by constructing the differential circuit 35 in a manner to insert a dummy resistor Rx in series to the resistor 44 when the differential circuit works by a time-end output from the control logic circuit 38. The differential circuit 35 is constructed to disconnect the resistor Rx when the comparator works. When the room temperature reaches the newly set ON-temperature x°C. at the time $t_{10}$ as shown in FIG. 4, the comparator 34 turns ON, and hence the differential circuit 35 works to connect hysteresis resistance 44 in parallel to the resistor 43 of the bridge circuit 33; at this time, the dummy resistor Rx is removed. Accordingly, the bridge circuit 33 becomes set at the voltage which correspond to the OFF-temperature Y°C. of the comparator 34. At the same time, by the turning ON of the comparator 34, the compressor 4 starts. As a result of the operation of the compressor, the room temperature is lowered. Then, when the temperature comes to the OFF-temperature Y°C., the comparator output turns OFF thereby stopping the compressor 4, and at the same time, the setting point of the bridge circuit 33 is restored to the voltage corresponding to the ON-temperature X°C. At the turning OFF of the comparator 34, the timer circuit 36 begins discharging and prevents restarting of compressor 4 until the time $t_{12}$. And thereafter at the time $t_{13}$, the setting of the bridge circuit 33 is lowered to the x°C., thereby realizing a forced restoration of the rotation of the compressor 4. As shown in FIG. 4, in the operation of the mode B, wherein the cooling load is light, the temperature gap $\beta$°C. between the newly set ON-temperature and the OFF-temperature is selected small, in comparison with the temperature gap $\alpha$°C. between the ON-temperature X°C. and the OFF temperature Y°C. of the mode A. By so setting, not only the temperature variation but also moisture variation can be made narrow in the mode B operation.

Figure 5:
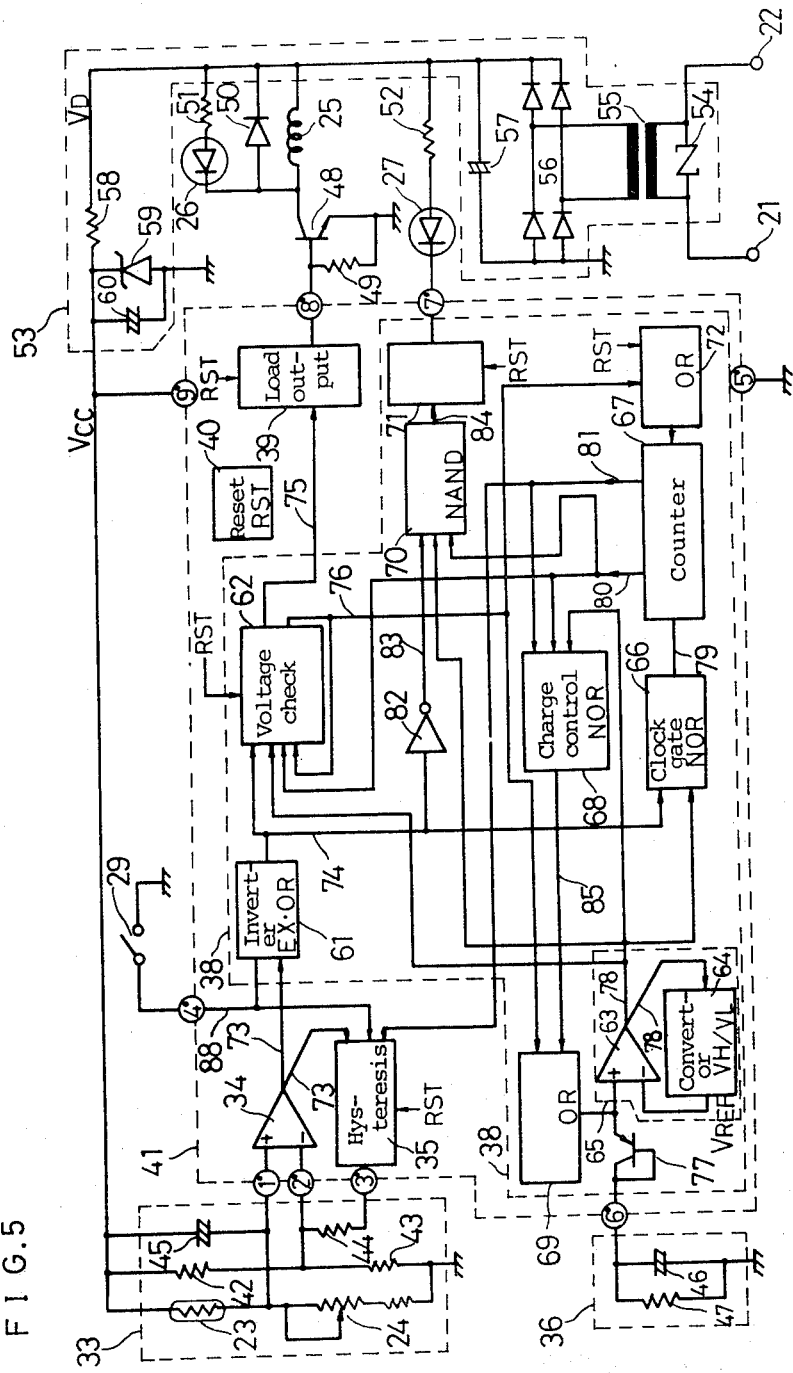
FIG. 5 is a more detailed circuit diagram of the operation time control apparatus of FIG. 3.

An example of a further detailed construction of the circuit of FIG. 3 is shown in FIG. 5 wherein the same numerals as in FIG. 3 shows the corresponding parts.

A power source 53 comprises a known surge absorber device 54 connected across the input terminals 21, 22 for the commercial A.C. lines, a transformer 55, diodes rectifier 56, a smoothing capacitor 57, a constant voltage circuit including a resistor 58, a Zenor diode 59 and a smoothing capacitor 60.

The principal part of the temperature control circuit 41 is provided in a form of semiconductor IC, wherein connection pins 1° to 9° are as follows:

| | |
|---|---|
| pin 1° | input terminal of the comparator 34 for the thermistor output from the bridge circuit 33, |
| pin 2° | input terminal of the comparator 34 for the reference voltage from the bridge circuit 33; voltage $V_S$ to this input terminal varies by the amount of $\Delta V$ by connection or disconnection of the hysteresis resistor 44, |
| pin 3° | input terminal of the differential circuit, |
| pin 4° | terminal to the cooling-heating selection switch 29, |
| pin 5° | ground terminal |
| pin 6° | charging and discharging terminal of the timer circuit, |
| pin 7° | a terminal to the indication lamp 27 to indicate the prevent time of the restarting of the compressor 4 |
| pin 8° | an output terminal to drive the relay 25 for controlling the compressor 4, |
| pine 9° | terminal to a D.C. power source. |

The control logic circuit 38 is constructed by comprising a signal inversion circuit 61 consisting of an exclusive OR circuit for inverting signal for the case of cooling and heating, a prevention circuit such as a voltage check circuit 62 for checking voltage of the timer circuit 36, a dual level comparator 65 consisting of a voltage comparator 63 and a voltage conversion circuit 64 which issues a lower reference voltage $V_L$ or a higher reference voltage $V_H$, responding to the output voltage of the voltage comparator 63, a clock gate 66 which controls clock signals issued by the voltage comparator 63, a counter 67 which counts the clock signals issued by the voltage comparator 63 and controlled by the clock gate 66 and thereby issues a first output signal from its output terminal 80 when receiving a first signal thereby making the time period $T_2$ and thereafter issues a time-end signal from its output terminal 81 when it received a predetermined number of input signals, thereby making the time period $T_1$, a charge-discharge control circuit 68 which controls charging and discharging of the timer circuit 36, a charging amplifier 69 which feeds charging current to the timer circuit 36, a compressor operation indicating circuit 70 to indicate the restarting prevention time $T_2$ of the compressor 4 by receiving the output from the output terminal 80 of the counter 67, an output ampifier 71 for amplifying the output of the indicating circuit 70, and a resetting circuit 72 to reset the counter 67.

The operation of the circuit of FIG. 5 is elucidated with reference to the time chart of FIG. 4. Immediately before the time $t_7$, the room temperature is higher than the OFF-temperature Y, and therefore the compressor 4 is operating. In this time, the output of the output line 73 of the comparator 34 is ON, and therefore, the input voltage at the input terminal pin 3° from the hysteresis circuit 35 is made zero volt, thereby connecting the resistor 44 parallelly to the resistor 43. Therefore the voltage of the pin 2° is the reference voltage $V_S$. At the same time, the signal at the output terminal 74 of the invertor 61 is ON and the signal at the output terminals 75 and 76 of the voltage check circuit 62 are also ON, and therefore, the load output circuit 39 makes the output transistor 48 On, thereby making the relay 25 to drive the compressor 4. And then, the timer circuit 36 is charged by an output of the charging amplifier 69 almost to reach the positive source voltage $V_{CC}$, and also, the counter 67 is reset by means of the output of the reset circuit 72. This is a time before the time $t_7$.

Then, at the time $t_7$ the temperature reaches the OFF-temperature Y°C., and hence the output terminal 73 of the comparator 34 becomes OFF level, thereby making the compressor 4 stop. And at the same time, the output 25 of the voltage check circuit 62 becomes OFF thereby making the charging amplifier 69 OFF; and accordingly, the voltage $V_C$ of the timer circuit 36 becomes lowered from the source voltage $V_{CC}$. At this time, the output terminal 78 of the voltage comparator 63 is ON, and the output terminal 79 of the clock gate 66 is retained OFF, and the output of the voltage converter 64 is set at the lower reference voltage $V_L$. Also, the first output terminal 80 of the counter 67 is ON and the last output terminal 81 thereof is OFF. Therefore, the indication lamp 27 is lit by the operation indication circuit 70. This is because, the output 74 of the invertor 61 is OFF, the output 83 of the inverter 82 is ON, the output 78 of the comparator 63 is ON and the output 80 is ON, and thereby the output 84 of the operation indicating circuit 70 is OFF, so that a current can flow from the positive source line $V_{CC}$, through the resistor 52, the indication lamp 27 and through amplifier 71 to the negative source point (ground). The voltage check circuit 62 locks its output at the output terminal 75 in OFF state, until its another output terminal falls to OFF thereby producing the first output from the output terminal 80 of the counter 67 even when the output 74 of the invertor 61 restores to ON. The charging control circuit 68 is a NOR gate and its output 85 is OFF, since its input signals, i.e., the output 78 of the voltage comparator 63 is ON, a first output 80 of the counter 67 is ON and the other output 81 of the counter 67 is OFF. By the OFF-output of the charging control circuit 68, the charging to the timer circuit 36 is not made, thereby making the charging continue. When time reaches $t_8$, the voltage $V_C$ of the timer circuit 36 reaches the lower reference voltage $V_L$, and therefore, the output 78 of the voltage comparator 63 turn from ON to OFF, thereby restoring the output of the comparator 64 to the higher reference voltage $V_H$. At this time the output 74 of the invertor 61, which is the input of the clock gate 66 is OFF. Therefore, upon falling of the output 78 of the voltage comparator 63 to OFF state, the output 79 of the clock gate 66 turns from OFF to ON. This rising-up edge is counted by the counter 67, and therefore the output terminal 80 of the counter 67 issues OFF output. As a result, the indication lamp 27 is put off and the locked state of the voltage check circuit 62 is released, and the voltage check circuit 62 is in ready state to transmit the output of the invertor 61 to the relevant circuits. Since the output terminal 81 of the counter 67 is still in OFF state, after the time $t_8$ of the turning OFF of the output terminal 80, the charging control circuit 68 is controlled only by the output 78 of the voltage comparator 63, and the charging control circuit 68 issues ON signal to charge the capacitor 46 only when the output 78 becomes OFF. And when the voltage $V_C$ of the timer circuit 36 comes to the higher reference voltage $V_H$, then the output 78 of the voltage comparator 63 turns from OFF to ON state, and accordingly the charging stops. As a result, the combination of the timer circuit 36, the voltage comparator 63, the voltage converter 64 and the charge control circuit 68 works as an oscillator. The oscillation pulses of this oscillator is sent through the clock gate 66 and to the counter 67. And, at the time $t_9$, the time-end signal (ON) is issued from the output terminal 81 of the counter. By receiving the time-end signal the charge control circuit 68 stops its output thereby stopping the charging to the timer circuit 36, and thereafter the timer circuit 36 starts discharging. When the time-end signal is issued from the output terminal 81, the hysteresis circuit 35 receives the time-end signal and makes the resistor 44 and the series dummy resistor be connected parallelly to the resistor 43, thereby lowering voltage at the terminal pin 2°. The change of output voltage of the bridge 33 by this connection of the resistor 44 corresponds to the change from X°C. to x°C. in FIG. 4. Thereafter, at the time $t_{10}$ the room temperature reaches the newly set temperature x°C., and therefore, the output 74 of the comparator 34 becomes ON, and together with the output ON of the invertor 61 the abovementioned operation is repeated.

In the operation of the mode A of FIG. 4, similarly to the abovementioned elucidation for the mode B, after turning OFF of the output 73 of the comparator 34, the voltage check circuit 62 becomes a ready state to produce an output signal upon receipt of the first count signal from the output terminal 80 of the counter 67. Accordingly, upon receipt of the output ON signal from the comparator 34, the load output circuit 39 receives an input signal, thereby making the compressor to rotate.

The abovementioned elucidation is for the application of the present apparatus to the all season type air conditioner. However, the operation time control apparatus of the present invention is not limited to the air conditioner, but also applicable to any apparatus which requires two or more times for its operation, for example, petroleum burner comprising a pre-purge system and burning confirmation system, or the like.

The apparatus in accordance with the present invention has the advantages that two or more independent time can be controlled with use of only one timer circuit 36, which requires accurate electric components, that at least one of the time obtained by the apparatus can be adjusted by shifting the reference voltage $V_L$ or $V_H$ of charging or discharging of the timer circuit by use of the electronic control circuit (63+64+68+69), and that by use of a counter which count number of waves of oscillation, which is made in the oscillation circuit comprising the timer circuit 36, the dual level comparator 65 and the charging control circuit 68, the frequency of the oscillation is variable by controlling the dual levels $V_H$ and $V_L$ of the dual level comparator 65. Therefore, a very wide range of times are obtainable.

What is claimed is:

1. An operation time control apparatus comprising
   a comparator (34) which issues ON-output signal and OFF-output signal responding to input signal thereto,
   a timer circuit (36) including a capacitor which is charged with said ON-output signal and is made to discharge upon issuing of said OFF-output,
   a dual level comparator (65), output signal of which turns off when an output voltage of said timer circuit (36) at the time after a turning off of said comparator (34) decreases to a lower reference voltage $V_L$ and turns on when the output voltage of said timer circuit (36) restores to a higher reference voltage $V_H$,
   a counter (67) which counts OFF-signals issued from said dual level comparator (65) when said comparator (34) turns off, and issues a first output signal based on a first output of said dual level comparator (65) and a time-end output signal when a predetermined number of said OFF-signals are counted,
   a charge control circuit (68) which, during a time period from the issuing of said first output signal to the issuing of said time end output signal, makes the charging of said capacitor with an OFF-output from said dual level comparator (65), and
   a prevention circuit (62) which prevent transfer of output of said comparator (34) to an output circuit (39) during a time period ($T_2$) from a turning off of the output of said comparator (34) to said issuance of said first output signal.

2. An operation time control apparatus in accordance with claim 1, wherein
   said first output signal is issued when a timer capacitor in said timer circuit is discharged from a predetermined charge limit level to said lower reference voltage $V_L$.

3. An operation time control aparatus in accordance with claim 1, wherein
   said time-end signal is issued when said predetermined number are counted with respect to oscillation waves including said timer circuit, said oscillation waves being repetitions of charge-and-discharge within said lower reference voltage $V_L$ and said higher reference voltage $V_H$.

4. An operation time control apparatus in accordance with claim 3, wherein said higher reference voltage $V_H$ is smaller than a charge limit voltage from which first discharging to produce said first output signal is made.

* * * * *